(12) United States Patent
LaFollette et al.

(10) Patent No.: US 6,212,171 B1
(45) Date of Patent: Apr. 3, 2001

(54) METHOD AND APPARATUS FOR GAP COUNT DETERMINATION

(75) Inventors: David LaFollette, Sunnyvale; Jerrold Hauck, Fremont, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/102,097

(22) Filed: Jun. 22, 1998

(51) Int. Cl.$^7$ ................................................. H04L 12/40
(52) U.S. Cl. .................. 370/257; 370/252; 709/253; 710/104
(58) Field of Search ........................................ 370/445, 448, 370/468, 231, 256, 437, 408, 257, 252; 709/253; 710/100, 104

(56) References Cited

U.S. PATENT DOCUMENTS

| | | | |
|---|---|---|---|
| 5,504,757 | * 4/1996 | Cook et al. | 370/468 |
| 5,687,319 | * 11/1997 | Cook et al. | 370/256 |
| 5,802,057 | * 9/1998 | Duckwall et al. | 370/408 |
| 5,991,520 | * 11/1999 | Smyers et al. | 710/100 |

OTHER PUBLICATIONS

"Analysis of Gap Count Settings for the IEEE–1394 Bus"; prepared by Jim Skidmore; Texas Instruments Incorporated Mixed Signal Products Group. Feb. 26, 1997.
"P1394A Enhancments"; prepared by Bill Duckwall; available at "ftp//ftp.symbios.com", Jun. 3, 1997.

* cited by examiner

Primary Examiner—Hassan Kizou
Assistant Examiner—John Pezzlo
(74) Attorney, Agent, or Firm—Kenyon & Kenyon

(57) ABSTRACT

A method and apparatus for determining a gap count for a serial bus network is described. A round-trip delay time for transmitting a packet from a first leaf node to a second leaf node and back over a communication path between the nodes for each pair of leaf nodes in the network is determined. A maximum round-trip delay time for each communication path is calculated. A node latency delay time for each leaf node in the network is determined. A longest maximum round-trip delay time and a longest node latency delay time is selected for the network, and a gap count is calculated using the selected times.

31 Claims, 7 Drawing Sheets

METHOD AND APPARATUS FOR GAP COUNT DETERMINATION

FIELD OF THE INVENTION

The invention relates to bus interfaces in general. In particular, the invention relates to a method and apparatus for determining a gap count for a serial bus.

BACKGROUND OF THE INVENTION

The recognition of the superior quality of digital technologies has resulted in an unprecedented demand for digital products. This is evidenced by the popularity of consumer electronic devices such as audio compact discs, direct broadcast satellite systems, digital video disc (DVD) players, and digital video tape systems, as well as personal computer (PC) peripheral devices such as compact disc read-only memory (CD-ROM) drives, DVD drives, video cameras, musical instrument digital interface (MIDI) devices, and digital scanners.

The popularity of digital devices prompted a need for a uniform digital interface capable of connecting such devices into a single network. Consequently, the Institute of Electrical and Electronics Engineers (IEEE) introduced Standard 1394 titled "IEEE Standard for a High Performance Serial Bus," IEEE Computer Society, Dec. 12, 1995 ("IEEE 1394").

IEEE 1394 enables isochronous service while providing the bandwidth needed for audio, imaging, video, and other streaming data. Isochronous service means it guarantees latency (i.e., the length of time between a requested action and when the resulting action occurs). Latency is a critical feature in supporting real time video, for example. IEEE 1394 provides a high-speed serial bus with data transfer rates of 100, 200, or 400 mega-bits per second.

It is well-known in the art that IEEE 1394 data transfer rates can be improved by optimizing a parameter referred to as a "gap count." If the gap count is set too low, timing based arbitration breaks down. For instance, some nodes may detect idle time as an arbitration reset gap before others detect a subaction gap. The smaller the gap count is set, the smaller the bus topology must be for the timing to work. If the gap count is set too high, arbitration works, but the bus efficiency suffers from the larger than necessary gaps. Consequently, it is a design goal for IEEE 1394 network designers to set the gap count to the lowest workable value for a particular topology without interfering with the timing of the network.

One technique for determining an optimum gap count for a particular serial bus network is described in Annex E of IEEE 1394 itself. Table E-6 of Annex E lists predefined gap counts based upon the longest chain of nodes bounded by a pair of end nodes ("longest daisy chain") in the network, which is often measured in terms of "hops." For example, a serial bus network having seven nodes in its longest daisy-chain would have a total of six hops, which according to Table E-6 merits a gap count of six. Various techniques exist for determining the number of hops in a network. For example, "self-ID" packets sent by each node can be used to reconstruct the topology of a bus network, or the bus manager can simply assume a maximum number of hops (16) for a given network.

A gap count derived using Table E-6 and the various methods for determining hops, however, is unsatisfactory for at least one major reason. Of particular importance in optimizing a gap count is ascertaining a maximum round trip propagation delay for sending a packet of information from one end node to another end node for a given daisy-chain. A minimum gap count is then calculated using the longest round trip propagation delay found in the network, among various other factors. Table E-6 lists a maximum round trip propagation delay for a given number of hops based on the assumption that the length of the transmission medium (e.g., co-axial cable) between each node is 4.5 meters. The actual length of each cable, however, could range as high as 100 meters or more. Therefore, the maximum round trip propagation delay assumed by Table E-6 could in practice be far less than what is actually incurred in a network. As a result, the gap count derived using Table E-6 could be set low enough to cause timing problems throughout the network.

Bill Duckwall in a paper titled "1394a Enhancements" available at "ftp//ftp.symbios.com" (the "Duckwall reference") suggests calculating a gap count using a maximum round-trip delay measured by "PHY pinging." According to the Duckwall reference, a diagnostic node transmits a special packet containing a target address ("ping packet"). The node starts a timer when transmission is complete. When the target node receives the ping, it sends back a ping response packet. The diagnostic node detects the ping response, stops the timer at start of reception, and calculates from the timer the propagation delay to the target node. The diagnostic node selects the longest delay in the network and sets the gap count accordingly.

The technique disclosed in the Duckwall reference, however, is unsatisfactory for a number of reasons. Foremost, the Duckwall reference assumes the diagnostic node is actually one of the end nodes of the daisy chain having the longest delay in the network. This suggests that each end node must have the appropriate hardware and software to perform PHY pinging. This requirement is expensive and redundant. Further, the Duckwall reference assumes that the measured delay is the maximum propagation delay time. The measured delay, however, is merely representative of a single ping of a particular daisy-chain, and therefore may not represent the worst case delay over that particular daisy-chain without further information.

In view of the foregoing, it can be appreciated that a substantial need exists for a method and apparatus for determining an improved gap count for a given network topology that solves the above-discussed problems.

SUMMARY OF THE INVENTION

One embodiment of the invention comprises a method and apparatus for determining a gap count for a serial bus network. A round-trip delay time for transmitting a packet from a first leaf node to a second leaf node and back over a communication path between the nodes for each pair of leaf nodes in the network is determined. A maximum round-trip delay time for each communication path is calculated. A node latency delay time for each leaf node in the network is determined. A longest maximum round-trip delay time and a longest node latency delay time is selected for the network, and a gap count is calculated using the selected times.

DETAILED DESCRIPTION

The various embodiments of the present invention comprise a method and apparatus for optimizing a gap count for a serial bus network, especially a network conforming to IEEE 1394. An optimal gap count significantly impacts the data transfer rates for a given network topology. If the gap count is set too low, timing based arbitration breaks down. For example, some nodes may detect idle time as an arbitration reset gap before others detect a subaction gap. The smaller the gap count is set, the smaller the bus topology must be for the timing to work. If the gap count is set too high, arbitration works, but the bus efficiency suffers from the larger than necessary gaps.

Figure 1:
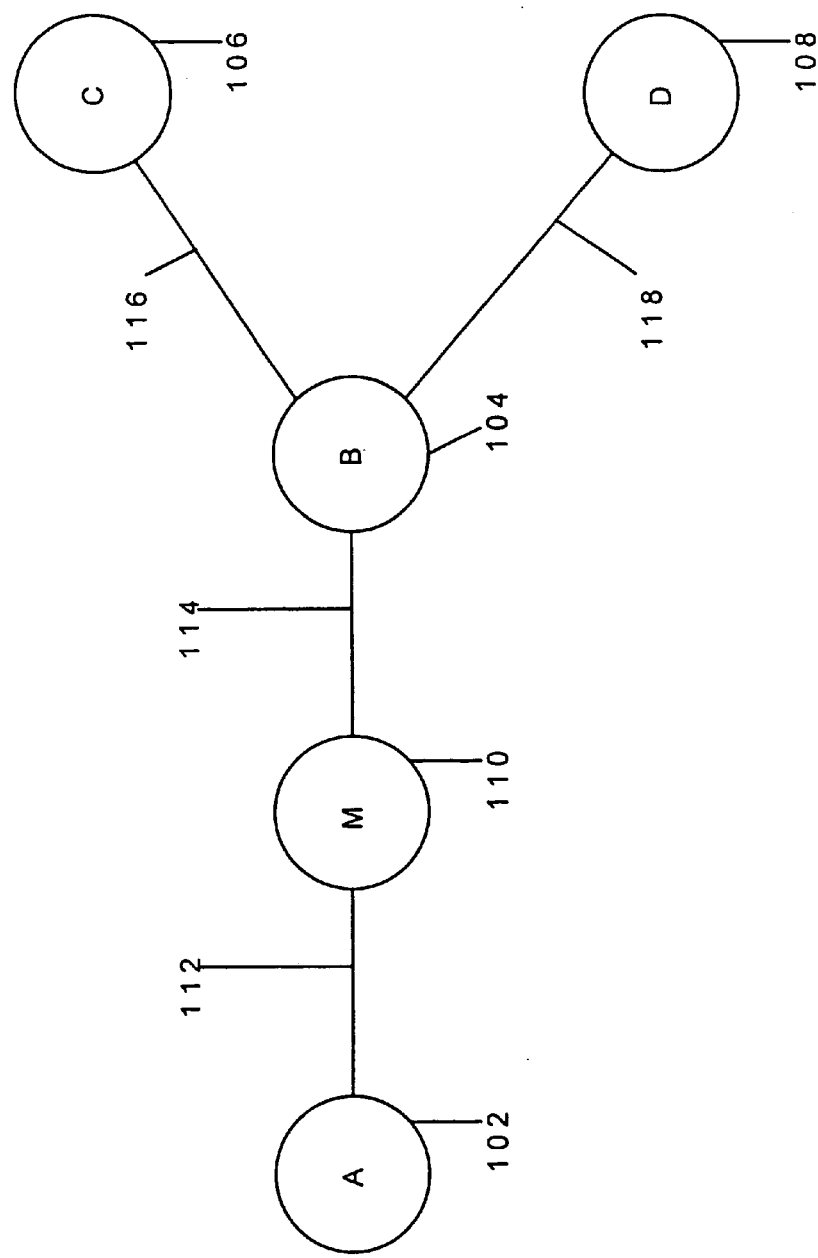
FIG. 1 is a diagram of a serial bus network suitable for practicing one embodiment of the invention.

FIG. 1 is a block diagram of a serial bus network suitable for practicing one embodiment of the invention. It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

FIG. 1 shows a serial bus network 100 that conforms to IEEE 1394. Network 100 comprises nodes A, B, C, D and M labeled 102, 104, 106, 108 and 110, respectively. Nodes A, M, B, C and D are connected by links 112, 114, 116 and 118, respectively. Node M (node 110) is a measuring node for network 100, and can be any node in network 100. In this embodiment of the invention, measuring node 110 is the bus manager node since the bus manager node, among other things, is responsible for optimizing performance of network 100.

As shown in FIG. 1, each node of network 100 is connected to another node via a communication link. In many instances, each node is connected to more than one node, such as nodes 104 and 110. There are, however, a number of nodes that are connected to only one other node in the network. Such nodes are typically referred to as "leaf nodes." For example, nodes 102, 106 and 108 are considered leaf nodes since they only connect with one other node. The importance of leaf nodes will be described in further detail later.

Figure 2:
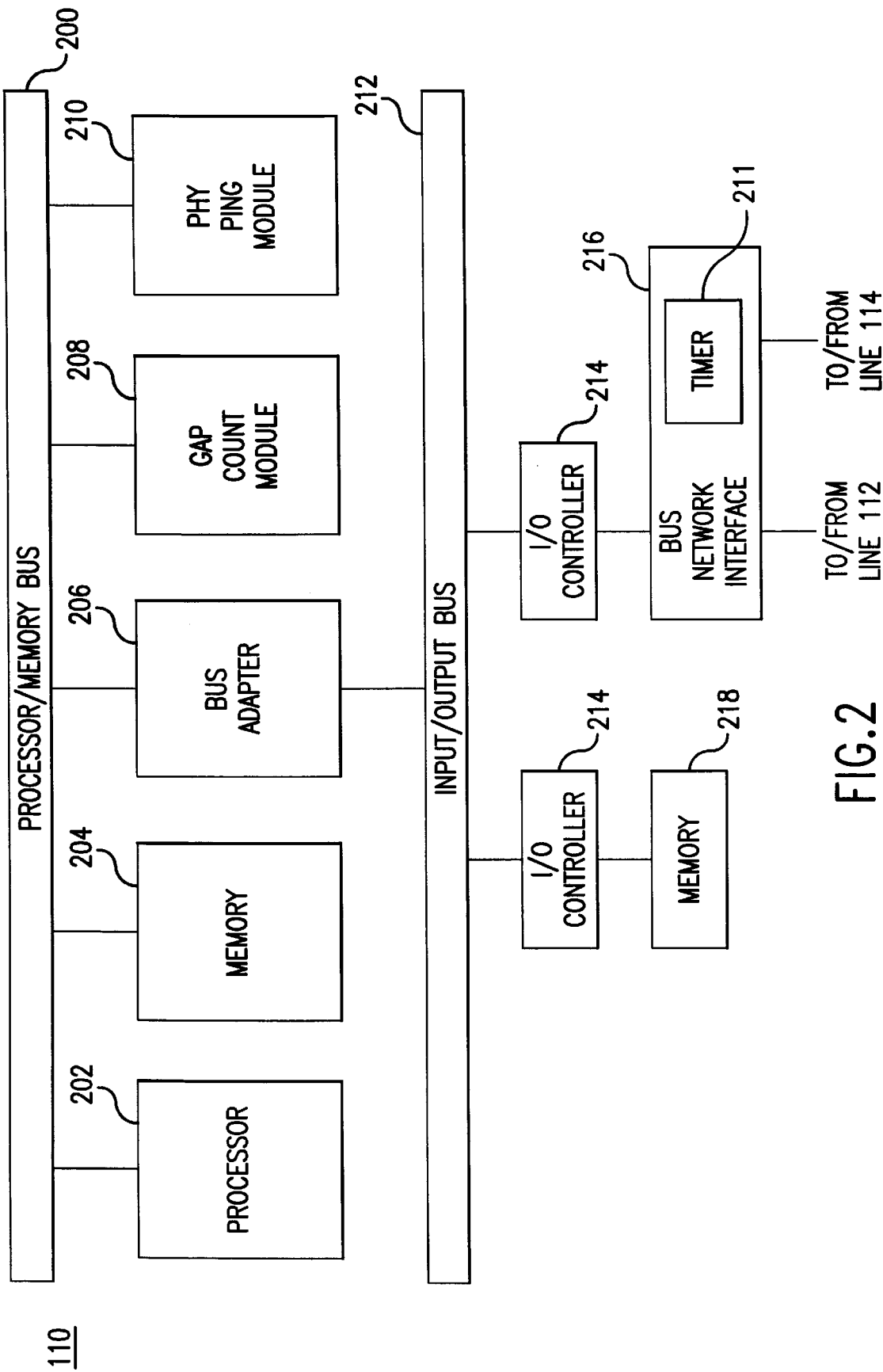
FIG. 2 is a block diagram of a measuring node in accordance with one embodiment of the invention.

FIG. 2 is a block diagram of a measuring node in accordance with one embodiment of the invention. FIG. 2 shows measuring node 110 comprising a processor 202, a memory 204, a bus adapter 206, a gap count module 208, and a PHY ping module 210, each of which is connected to a processor/memory bus 200 and an Input/Output (I/O) bus 212 via bus adapter 206. Further, measuring node 110 contains a bus network interface 216 and memory 218, both of which are connected to I/O bus 212 via I/O controllers 214. The term "PHY" as used herein refers to the physical layer of a network as specified by IEEE 1394.

The overall functioning of measuring node 110 is controlled by processor 202, which operates under the control of executed computer program instructions and data stored in memory 204 or memory 218. Memory 204 may be any type of "fast" machine readable storage device, such as random access memory (RAM), read only memory (ROM), programmable read only memory (PROM), erasable programmable read only memory (EPROM), electronically erasable programmable read only memory (EEPROM), and so forth. Memory 218 may be any "slow" machine readable memory such as magnetic storage media (i.e., a magnetic disk), optical storage media (i.e., a CD-ROM or DVD), and so forth.

Processor 202 includes any processor of sufficient processing power to perform the functionality found in measuring node 110. Examples of processors suitable to practice the invention includes the Pentium™, Pentium™ Pro, and Pentium™ II microprocessors manufactured by Intel Corporation.

Bus network interface 216 controls communications between nodes via links 112, 114, 116 and 118 using the protocols, services and operating procedures set forth in IEEE 1394. Bus network interface 216 also includes a timer 211 for timing a round-trip delay time for packets sent between leaf nodes of a network. I/O controllers 214 control the flow of information between measuring node 110 and bus network interface 216 and memory 218. Bus adapter 206 transfers data back and forth between processor/memory bus 200 and I/O bus 212.

Gap count module 208 and PHY pinging module 210 implement the main functionality for measuring node 110. It is noted that modules 208 and 210 are shown as separate functional modules in FIG. 2. It can be appreciated, however, that the functions performed by these modules can be further separated into more modules, combined together to form one module, or be distributed throughout the system, and still fall within the scope of the invention. Further, the functionality of these modules may be implemented in hardware, software, or a combination of hardware and software, using well-known signal processing techniques. When implemented in software, the computer program segments or instructions are stored in computer readable memory such as memory 204 and memory 218, and are executed by a processor such as processor 202. The operation of these modules will be described in further detail below with reference to FIG. 3.

Figure 3:
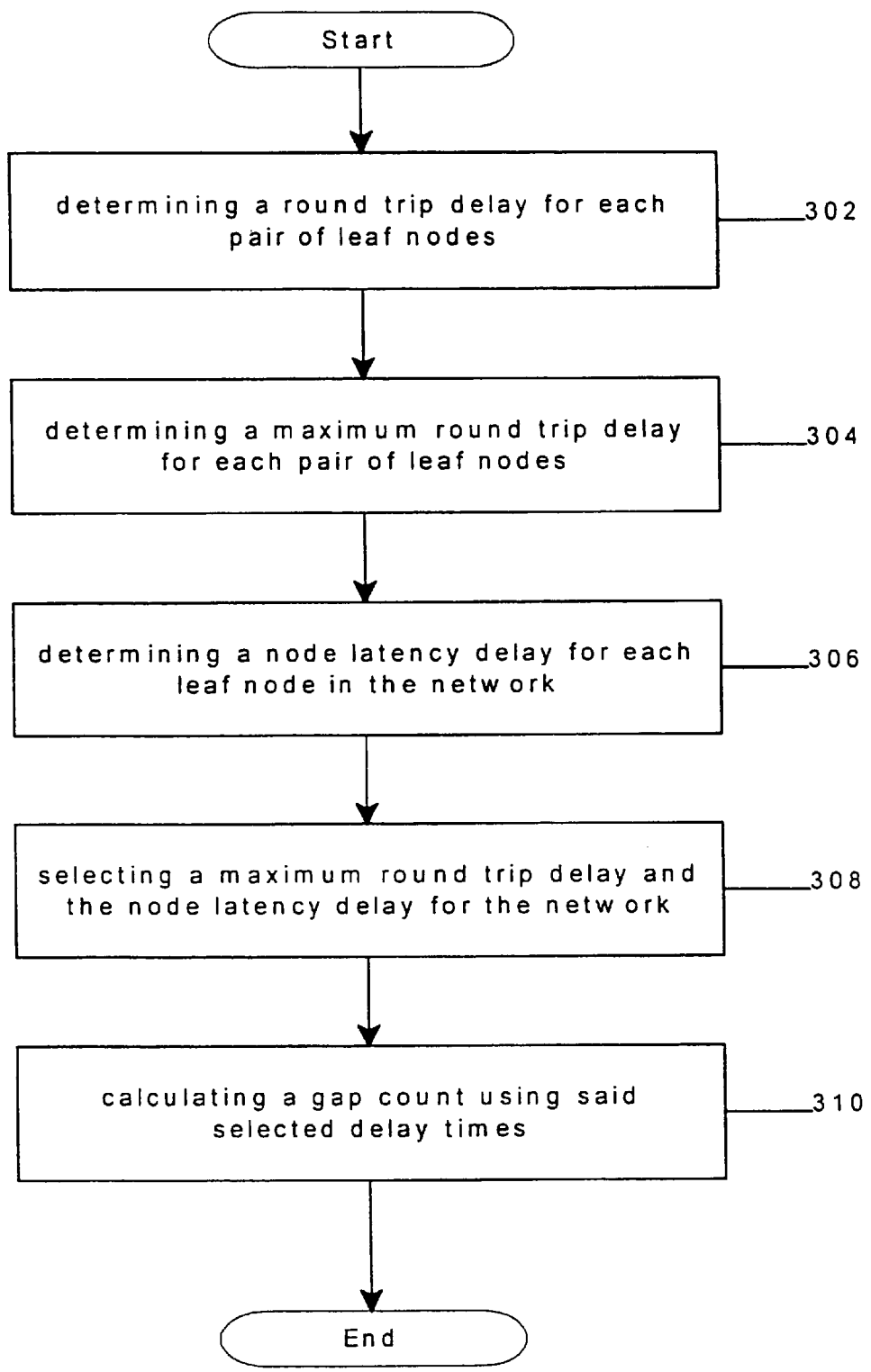
FIG. 3 is a block flow diagram of the steps performed by a measuring node in accordance with one embodiment of the invention.

FIG. 3 is a block flow diagram of the steps performed by a measuring node in accordance with one embodiment of the invention. The communication path with the longest delay in the network is the one that determines the gap count. Since the actual delay across the physical layer for each node ("PHY delay" or "node latency delay")) and the actual delay across each cable connecting the nodes ("cable delays") are unknown, each leaf to leaf path must be checked and the worst one used. It is worthy to note that the longest delay is not necessarily in the path with the most nodes.

The measuring node measures a round trip delay time for a packet traveling over a communication path between a pair of leaf nodes for every pair of leaf nodes in the network at step 302. The measuring node measures round trip delay time by transmitting a ping packet and timing the return of a self-ID packet (IEEE P1394a) transmitted in response. Alternatively, any PHY packet that provokes a response from the addressed PHY may be used. For example, a remote access packet may be used both to obtain PHY jitter from another PHY and measure the propagation time in the same step. Additional details with respect to step 302 will be discussed later with reference to FIGS. 4 and 5.

Once the measuring node acquires a round trip delay time for a pair of leaf nodes, the measuring node uses the measured propagation times to calculate a maximum round trip time for each pair of leaf nodes at step 304. This is because the measured propagation time changes for each measured ping, and therefore for purposes of setting a gap count cannot be considered the maximum delay time. Rather, it must be assumed to be the shortest time for this particular communication path. To set a gap count, however, a maximum round trip delay for the network must be determined. Therefore, a maximum round trip delay for each communication path must be first be determined. This can be accomplished in two ways, the first of which is described below. The second method is described with reference to FIG. 6 below.

The first method for determining a maximum round trip delay for a given communication path is through calculation. The time measured by PHY pinging from the measuring node to another node includes the data end of the PHY ping request, the delays through the measuring node, the cable and PHY propagation delays in both directions, the target arbitration response delay, the PHY ping response time and measurement error. This is represented by the following formula:

$$\text{PingMeas}=\text{DE}+\text{LinkToPhyDel}_{BM}+2((\text{hops}-1)*(\text{CD}+\text{PD}))+2\text{CD}+\text{ArbRespDel}+\text{PingRespTime}+\text{PhyToLinkDel}_{BM}+\text{MeasError}.$$

Since the measured propagation time consists essentially of cable delays and PHY delays, the maximum propagation time is calculated by adding jitter terms and subtracting the minimums of the undesired terms from the measured time. Jitter may be obtained from the PHY register $0100_2$, as identified in IEEE 1394, for each repeating PHY along the path. Thus, the maximum round trip time is calculated using the following equation:

$$\text{Propmax}=\text{PingMeas}-\text{DEMin}-\text{LinkToPhyDelMin}_{BM}+2((\text{hops}-1)*(\text{JPD}))-\text{ArbRespDelMin}-\text{PingRespTimeMin}-\text{PhyToLinkDelMin}_{BM}.$$

The minimum propagation time is calculated by subtracting jitter terms and the minimums of the undesired terms from the measured time, as follows:

$$\text{Propmin}=\text{PingMeas}-\text{DEMax}-\text{LinkToPhyDelMax}_{BM}-2((\text{hops}-1)*(\text{JPD}))-\text{ArbRespDelMax}-\text{PingRespTimeMax}-\text{PhyToLinkDelMax}_{BM}.$$

The maximum and minimum round trip delay times for a given communication path are the aggregate cable and PHY delay adjusted for jitter. Any delay caused by arbitration or the PHY/link interface is subtracted out. The Ping Time, measured by link hardware, starts when the most significant bit of the ping packet is transferred from the link to the PHY and ends when a data prefix indication is signaled by the PHY. The term for PHY jitter is the sum of individual PHY jitter for each of the repeating PHYs on the path between the measuring node and the pinged node. This can be obtained by a remote read of the PHY registers. The resultant round-trip delay is expressed in units of microseconds.

In addition to determining maximum round trip delays for each communication path between leaf nodes in the network, the response time need for each leaf mode is determined at step 306. This time is referred to as a leaf node latency delay or leaf PHY delay. Each leaf PHY delay can be determined from each leaf node's own PHY register.

As stated previously, the path having the worst (i.e., longest) round trip delay in the network is the one which determines the gap count. Therefore, the measuring node selects the value representing the longest maximum round-trip delay of all the leaf pairs in the network at step 308. The worst leaf PHY delay is also selected at step 308.

Using the worst maximum round-trip delay and PHY delay for the network, a gap count (GC) is calculated at step 310 using the following equation:

$$\text{GC}=((\text{BRMin})*(\text{BRMax})*(\text{RTDelMax}+\text{ArbRespDelMax}_A+\text{ArbRespDelMax}_B)-51\text{BRMin}+29\text{BRMax})/(32\text{BRMin}-20\text{BRMax}).$$

This formula can be reduced as follows:

$$\text{GC}=8.196\times(\text{RTDelMax}+\text{ArbRespDelMax}_A+\text{ArbRespDelMax}_B)-1.833.$$

The worst case round-trip delay is expressed in microseconds. The PHY delay term accounts for the maximum arbitration response delay of the two leaf nodes. The terms $\text{ArbRespDelMax}_A$ and $\text{ArbRespDelMax}_B$ may be replaced with the sum of the maximum PHY delays for the two leaf nodes for the worst case path. The resulting Gap Count is rounded to the next highest integer. The Gap Count may be transmitted in a PHY configuration packet to optimize the performance of network 100.

As shown in FIG. 3 and described above, the measuring node determines a round-trip delay for each pair of leaf nodes in a network at step 302. The technique used to determine the round-trip delay, however, varies according to where the measuring node is located with respect to the leaf nodes. The possible topologies resolve into three categories:

1. The measuring node is a leaf and the round-trip delay is to be measured to another leaf;
2. The measuring node is not a leaf but is on the path that connects two leaves whose round-trip delay is to be measured; and
3. The measuring node is neither a leaf nor on the path that connects two leaves whose round-trip delay is to be measured.

With respect to topology 1, assume that nodes B, C and D are not present, that is, node M and node A are leaf nodes. The round-trip delay is the propagation time measured from node M to node A and back. Topologies 2 and 3 will be described below with reference to FIGS. 4 and 5, respectively.

Figure 4:
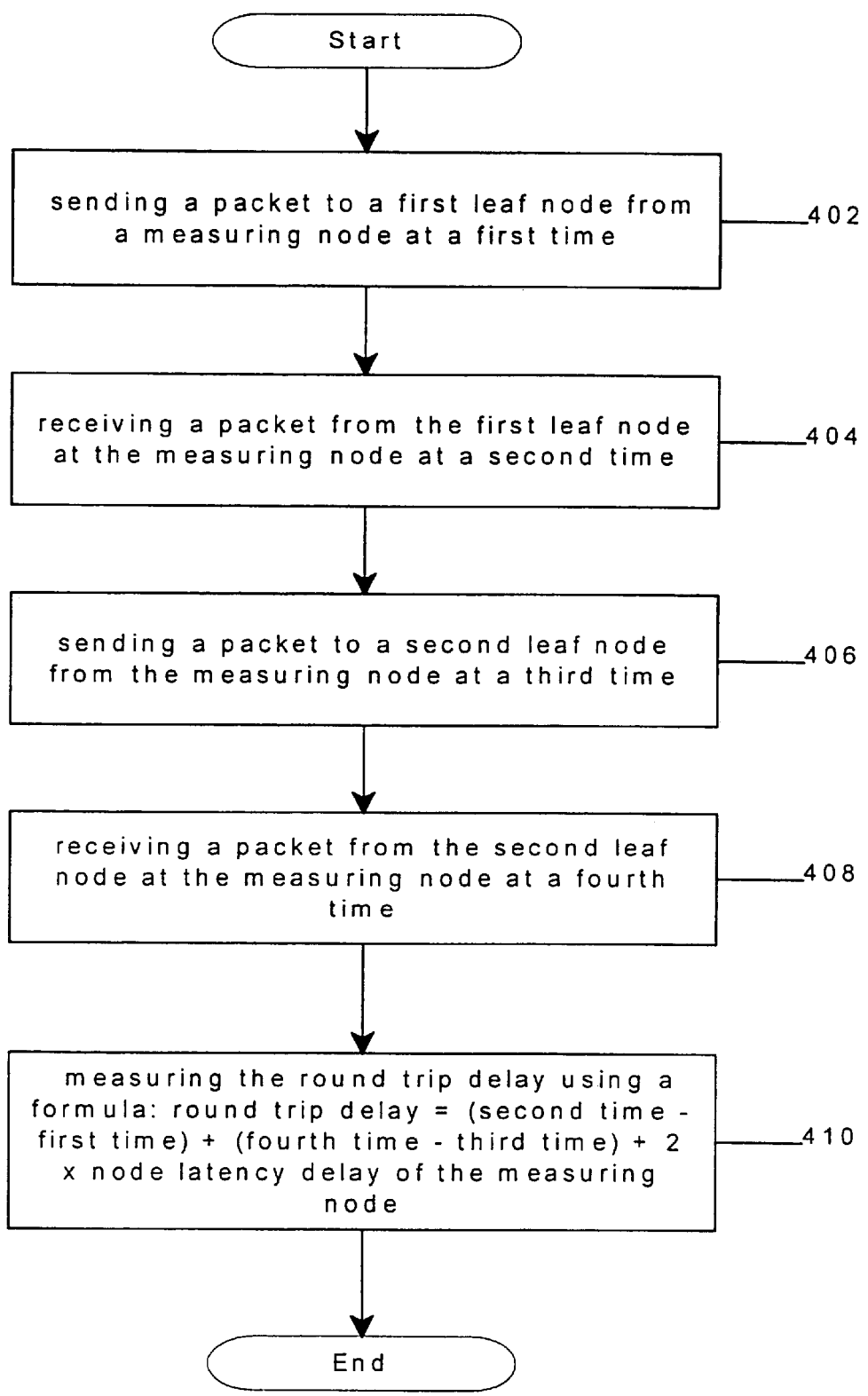
FIG. 4 is a block flow diagram of the steps for measuring round-trip delay times when the measuring node is on the path to be measured, in accordance with one embodiment of the invention.

FIG. 4 is a block flow diagram of the steps for measuring round-trip delay times when the measuring node is on the path to be measured, in accordance with one embodiment of the invention. As shown in FIG. 4, the measuring node sends a ping packet to a first leaf node from a measuring node at a first time at step 402. A response packet is received at the measuring node from the first leaf node at step 404. The measuring node sends a ping packet to a second leaf node from the measuring node at a third time at step 406. A response packet is received at the measuring node from the second leaf node at a fourth time at step 408. The round-trip delay for the path is calculated at step 410 using the following formula:

Round-trip delay=(second time−first time)+(fourth time−third time)+2×the PHY delay of the measuring node.

For example, assume that the round-trip delay is to be calculated between nodes A and C as shown in FIG. 1. Node M measures the propagation time from itself to node A and from itself to node C. The round-trip delay between the two leaf nodes also needs to account for the PHY delay of node M and is expressed by:

Round-trip delay$_{(A,C)}$=Propagation time$_A$+Propagation time$_C$+2× PHY delay$_M$.

In the formula above, all of the times are maxima, and the measuring node's PHY delay is obtained from its own PHY registers.

Figure 5:
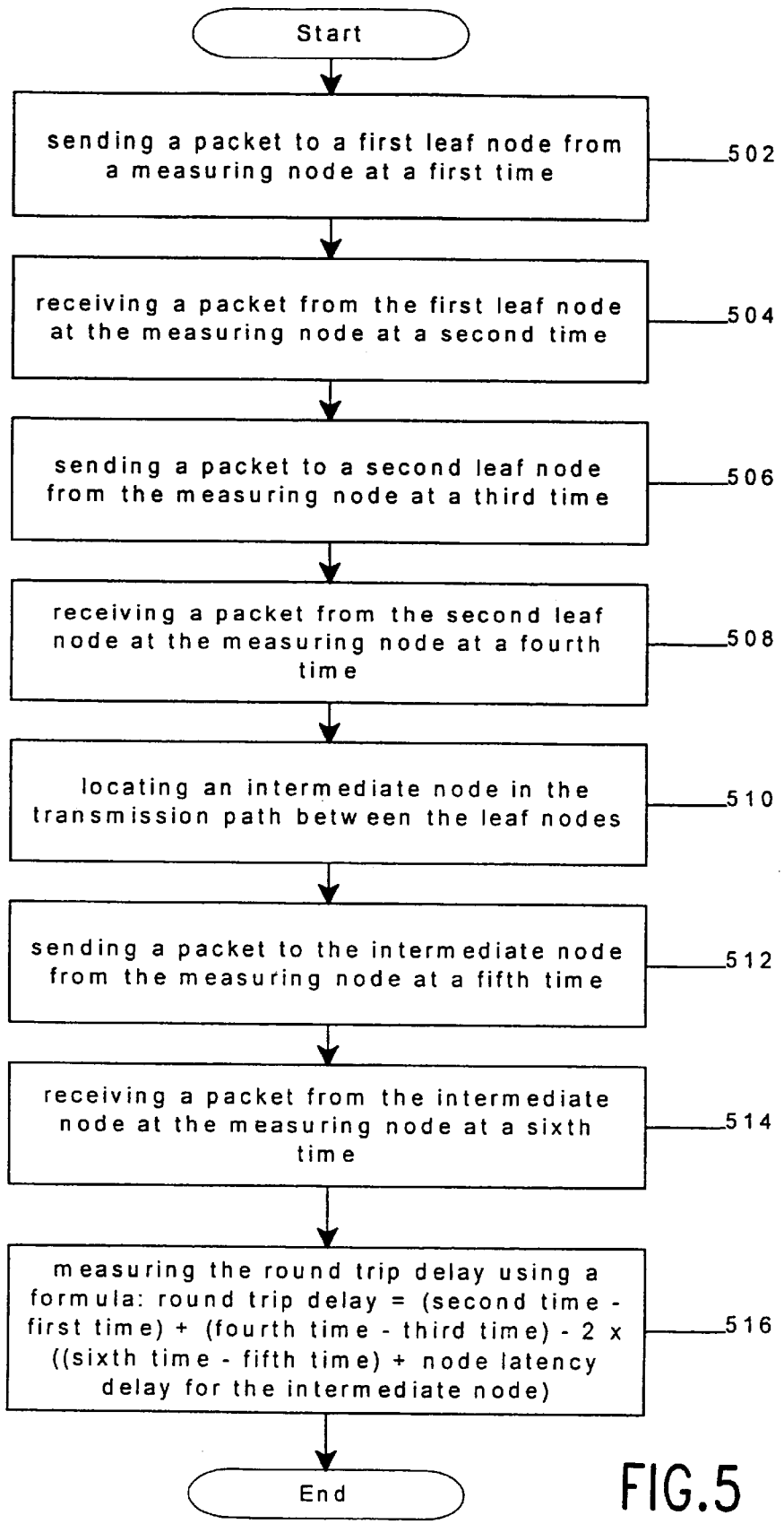
FIG. 5 is a block flow diagram of the steps for measuring round-trip delay time when the measuring node is not on the path to be measured, in accordance with one embodiment of the invention.

FIG. 5 is a block flow diagram of the steps for measuring round-trip delay time when the measuring node is not on the path to be measured, in accordance with one embodiment of the invention. In this embodiment of the invention, steps 502, 504, 506 and 508 are similar to steps 402, 404, 406 and 408 described with reference to FIG. 4, respectively. The measuring node then locates an intermediate node that is on the communication path being measured at step 510. The measuring node sends a ping packet to the intermediate node at a fifth time at step 512. The measuring node receives a response packet from the intermediate node at a sixth time at step 514. The measuring node measures the round-trip delay at step 516 using the following formula:

Round-trip delay=(second time−first time)+(fourth time−third time)−2×((sixth time−fifth time)+PHY delay for the intermediate node).

Referring again to FIG. 1, assume the measuring node is to determine a round-trip delay between nodes C and D. Node M measures propagation times to both nodes C and D. The measuring node then measures the propagation time to the node closest to the measuring node that is also on the path between the leaf nodes. In this example it would be node B. These measurements are combined to eliminate the propagation time from the measuring node to node B and the excess PHY delay for node B (measured twice in the propagation times for nodes C and D) as follows:

Round-trip delay$_{(C,D)}$=Propagation time$_C$+Propagation time$_D$−2×(Propagation time$_B$+PHY delaY$_B$).

In this case, the propagation times measured for nodes C and D are minima while the propagation times measured to node B is maximum. The PHY delay for node B is obtained by remote access to that node's PHY registers.

Returning again to FIG. 3, the measuring node determines a maximum round-trip delay for each pair of leaf nodes at step 304. The maximum propagation time is calculated by adding jitter terms and subtracting the minimums of the undesired terms from the measured time. Alternatively, this can be accomplished as described with reference to FIG. 6 below.

Figure 6:
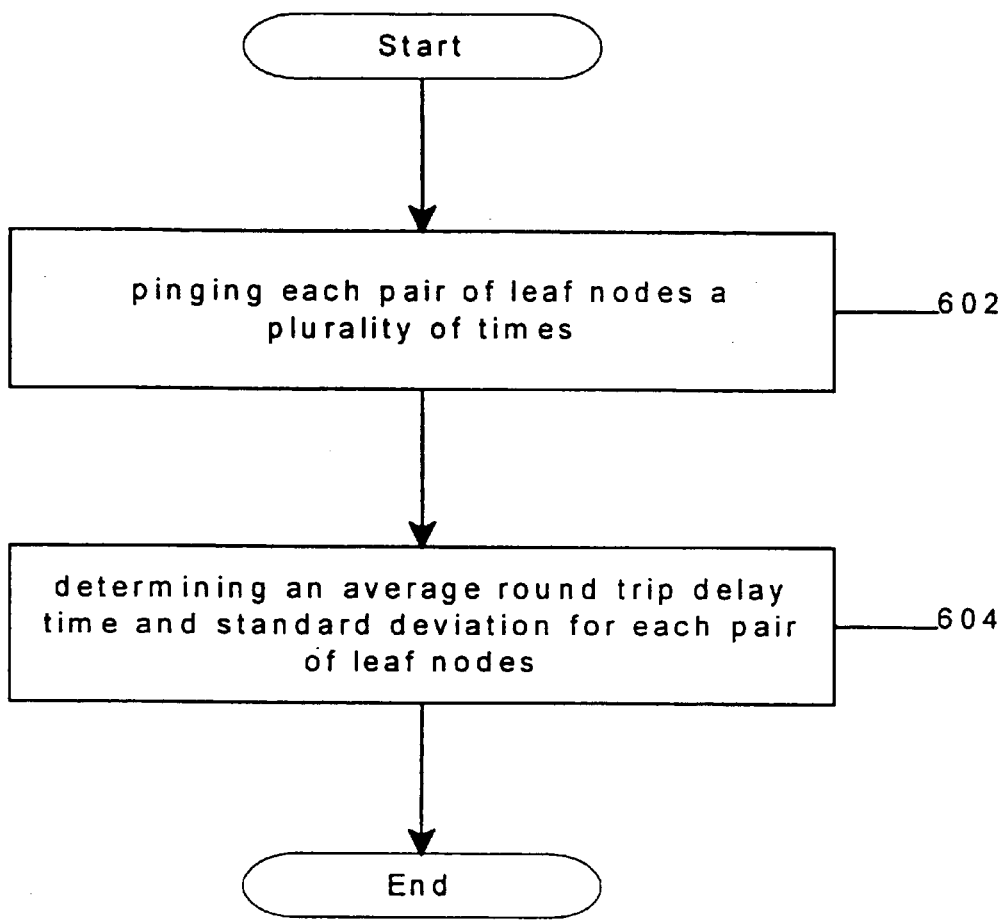
FIG. 6 is a block flow diagram of the steps for determining a maximum round-trip delay for a pair of leaf nodes in accordance with one embodiment of the invention.

FIG. 6 is a block flow diagram of the steps for determining a maximum round-trip delay for a pair of leaf nodes in accordance with one embodiment of the invention. The measuring node pings each pair of leaf nodes a plurality of times at step 602. The measuring node then determines an average round-trip delay time and standard deviation for each pair of leaf nodes at step 604. These values would represent actual jitter and are used to replace the calculated jitter terms described previously. This would tighten the bounds on the calculated propagation times and result in the selection of a more optimal gap count.

Figure 7:
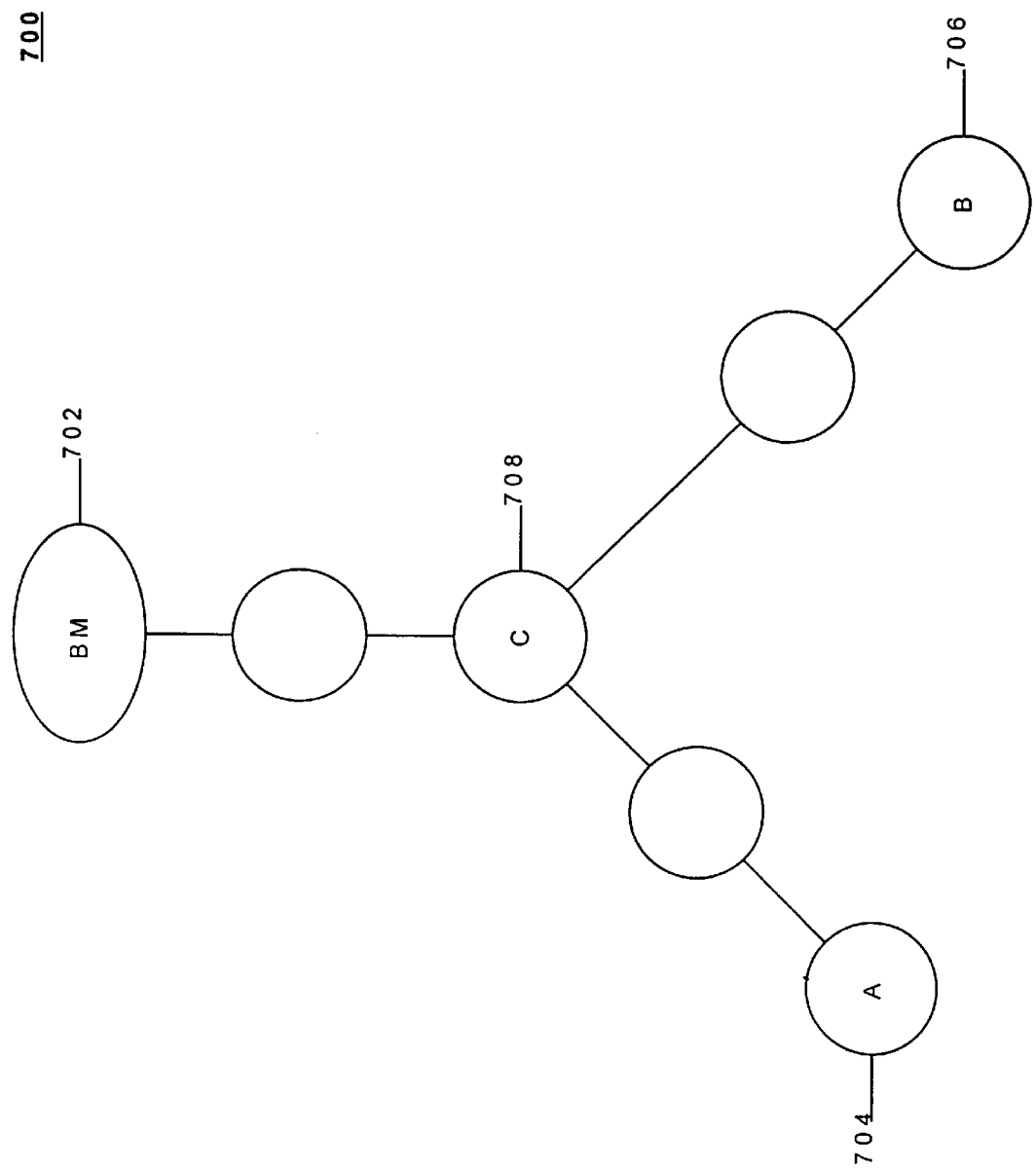
FIG. 7 is a serial bus network suitable for practicing another embodiment of the invention.

FIG. 7 is a bus serial network suitable for practicing one embodiment of the invention. FIG. 7 illustrates a network 700 comprising a bus manager node 702, a node A (704), a node B (706) and a node C (708). Lines 710, 712, 714, 716 and 720 are each 4.5 meters long. Line 718 is 100 meters long. Bus manager node 702 incorporates functionality similar to measuring node 110 as described with reference to FIGS. 1 and 2.

A gap count will be determined for network 700 in accordance with the principles of the invention described above. The equations used to derive an optimal gap count are similar to those described with reference to FIGS. 1–6, with some redefined terms, defined values, and suggested values, as shown in Table 1 below. In some instances, the term is a shortened version of a term defined in IEEE 1394 and IEEE P1394a. The subscripts BM, A, B and C refer to a Bus Manager and nodes A, B and C, respectively. It should be noted that the values listed in Table 1 are exemplary only, and can be modified in accordance with changes in the IEEE P1394a specification and still fall within the scope of the invention.

TABLE 1

| TERM | IEEE 1394 MEANING | IEEE 1394 DEFINED VALUE | SUGGESTED VALUE |
|---|---|---|---|
| ArbDelMax | Maximum arb_delay | GC*4/BRMin | |
| ArbResetGapMin | Minimum generated Arb reset gap | (51 + GC * 32)/BRMax | |
| ArbRespDel | | | PD |
| BRMax | Maximum BASE_RATE | 98.314 Mbit/S | |
| BRMin | Minimum BASE_RATE | 98.294 Mbit/S | |
| CD | Cable Delay | | |
| DE | DATA_END_TIME | 0.24 uS to 0.26 uS | |
| GC | Gap Count | ((BRMin)*(BRMax)*(RT DelMax + ArbRespDelMax$_A$ + ArbRespDelMax$_B$) − 51 BRMin + 29 BRMax)/(32 BRMin − 20 BRMax) | |
| Hops | Cable hops between nodes | | |
| JPD | Jitter in PHY Delay | | 20 nano-seconds (nS) (1 SClk period) |
| LinkToPhyDel | Link to PHY Delay | | 40 nS – 62 nS |
| MeasError | Phy Ping Measurement Error | | |
| PD | PHY Delay | max 144 nS | min 33.3 nS |

TABLE 1-continued

| TERM | IEEE 1394 MEANING | IEEE 1394 DEFINED VALUE | SUGGESTED VALUE |
|---|---|---|---|
| PDDeltaMin | | $PDMin_{BMA} + PDMin_{BMB} - PDMax_{AB}$ | |
| PhyToLinkDel | PHY to Link Delay | | 81 nS – 102 nS (8/BRMax – 10/BRMin) |
| PingMeas | Measured round trip time to a node from measuring node | $DE + LinkToPhyDel_{BM} + 2((hops-1)*(CD + PD)) + 2 CD + ArbRespDel + PingRespTime + PhyToLinkDel_{BM} + MeasError$ | |
| PingRespTime | PHY Ping Response Time | | 122 nS – 143 nS (12/BRMax – 14/BRMin) |
| PropMax | Calculated maximum round trip time to a node from measuring node | $PingMeas - DEMin - LinkToPhyDelMin_{BM} + 2((hops-1)*(JPD)) - ArbRespDelMin - PingRespTimeMin - PhyToLinkDelMin_{BM}$ | |
| PropMin | Calculated minimum round trip time to a node from measuring node | $PingMeas - DEMax - LinkToPhyDelMax_{BM} - 2((hops-1)*(JPD)) - ArbRespDelMax - PingRespTimeMax - PhyToLinkDelMax_{BM}$ | |
| RTDel | Round Trip Delay | $2(hops-1)*(CD+PD) + 2 CD$ | |
| SubactionGapMax | Maximum Observed Subaction Gap | $(29 + 16 GC)/BRMin + ArbDelMax + RTDelMax + ArbRespDelMax_A + ArbRespDelMax_B$ | |

The following assumptions are made in calculating a gap count for network 700. A Round Trip delay is defined to include round trip cable and PHY propagation delays as follows: $RTDel=2(hops-1)*(CD+PD)+2CD$. To insure that no node sees an arb reset gap before another node sees a subaction gap, Gap Count is set such that ArbResetGapMin>SubactionGapMax. The minimum detection time for arb reset gap is as follows: $ArbResetGapMin=(51+32GC)/BRMax$. The maximum observed subaction gap is as follows: $SubactionGapMax=(29+16GC)/BRMin+ArbDelMax+RTDelMax+ArbRespDelMax_A+ArbRespDelMax_B$, with $ArbDelMax=4GC/BRMin$. Thus, for the smallest usable gap count:

$(51+32GC)/BRMax=(29+16GC)/BRMin+ArbDelMax+RTDel-Max+ArbRespDelMax_A+ArbRespDelMax_B;$ $51BRMin+32BRMin(GC)=29BRMax+16BRMax(GC)+4BRMax(GC)+(BRMin)*(BRMax)*(RTDelMax+ArbRespDel-Max_A+ArbRespDelMax_B);$ $GC(32BRMin-20BRMax)=(BRMin)*(BRMax)*(RTDelMax+Arb-RespDelMax_A+ArbRespDelMax_B)-51BRMin+29BRMax;$ $GC=((BRMin)*(BRMax)*(RTDelMax+ArbRespDelMax_A+ArbRe-spDelMax_B)-51BRMin+29BRMax)/(32BRMin-20BRMax).$ The following assumptions are made in determining a maximum round trip delay for network 700. The time measured by PHY pinging from the Bus Manager to another node is shown by $PingMeas=DE+LinkToPhyDel_{BM}+2((hops-1)*(CD+PD))+2CD+ArbRespDel+PingRespTime+PhyToLinkDel_{BM}+MeasError$. The calculated maximum propagation time is the measured time plus uncertainties minus the minimums of the undesired terms, as shown in $PropMax=PingMeas-DEMin-LinkToPhyDelMin_{BM}+2((hops-1)*(JPD))-ArbRespDelMin-PingRespTimeMin-PhyToLinkDelMin_{BM}$. The calculated minimum propagation time is the measured time minus uncertainties minus the maximums of the undesired terms, as shown in $PropMin=PingMeas-DEMax-LinkToPhyDelMaX_{BM}-2((hops-1)*(JPD))-ArbRespDelMax-PingRespTimeMax-PhyToLinkDelMax_{BM}$.

When pinging from the bus manager node to nodes A and B, the PHY delays seen through node C are along the paths between the port leading to the bus manager and the ports leading to nodes A and B. The PHY delay of interest, however, is the one between the child ports along the path from node A to node B. Thus, the PHY Delay Delta is defined as the difference between the sum of the port to port paths between the bus manager node and nodes A and B minus the port to port path between nodes A and B. It is worthy to note that this value may be different in nodes which have 1394B ports than in 1394A nodes.

In this example, the bus manager must ping all the other leaf nodes, A and B. It must then calculate the maximum round trip delay for all leaf to leaf paths, BM to A, BM to B, and A to B. The biggest round trip delay is then used to calculate a gap count for network 700.

The following additional values are defined for network 700 in Table 2 below.

TABLE 2

| Term | Actual Value |
|---|---|
| DE | 250nS |
| $LinkToPhyDel_{BM}$ | 51nS |
| CD | 5.05nS/M*length |
| PD | 100nS |
| $ArbRespDel_A$ | 100nS |

TABLE 2-continued

| Term | Actual Value |
|---|---|
| PingRespTime | 132nS |
| PhyToLinkDel$_{BM}$ | 92nS |
| MeasError | 10nS |

The measured round trip time to nodes A, B and C from the bus manager are:

$$\begin{aligned}
\text{PingMeas}_A &= \text{DE} + \text{LinkToPhyDel}_{BM} + 2((\text{Hops}-1)(\text{CD}+\text{PD})) + \\
&\quad 2*\text{CD} + \text{ArbRespDel}_A + \text{PingRespTime}_A + \\
&\quad \text{PhyToLinkDel}_{BM} + \text{MeasError} \\
&= 250 \text{ nS} + 51 \text{ nS} + 8*5.05 \text{ nS/M}*4.5 \text{ M} + 6*100 \text{ nS} + \\
&\quad 100 \text{ nS} + 132 \text{ nS} + 92 \text{ nS} + 10 \text{ nS} \\
&= 1417 \text{ nS} \\
\text{PingMeas}_B &= \text{DE} + \text{LinkToPhyDel}_{BM} + 2((\text{Hops}-1)(\text{CD}+\text{PD})) + \\
&\quad 2*\text{CD} + \text{ArbRespDel}_B + \text{PingRespTime}_B + \\
&\quad \text{PhyToLinkDel}_{BM} + \text{MeasError} \\
&= 250 \text{ nS} + 51 \text{ nS} + 6*5.05 \text{ nS/M}*4.5 \text{ M} + \\
&\quad 2*5.05 \text{ nS/M}*100 \text{ m} + 6 * 100 \text{ nS} + 100 \text{ nS} + \\
&\quad 132 \text{ nS} + 92 \text{ nS} + 10 \text{ nS} \\
&= 2381 \text{ nS} \\
\text{PingMeas}_C &= \text{DE} + \text{LinkToPhyDel}_{BM} + 2((\text{Hops}-1)(\text{CD}+\text{PD})) + \\
&\quad 2*\text{CD} + \text{ArbRespDel}_C + \text{PingRespTime}_C + \\
&\quad \text{PhyToLinklDel}_{BM} + \text{MeasError} \\
&= 250 \text{ nS} + 51 \text{ nS} + 4 * 5.05 \text{ nS/M} * 4.5 \text{ M} + \\
&\quad 2*100 \text{ nS} + 100 \text{ nS} + 132 \text{ nS} + 92 \text{ nS} + 10 \text{ nS} \\
&= 926 \text{ nS}
\end{aligned}$$

The following equations do not assume the use of statistical methods to eliminate the Phy delay jitter terms. Results may be improved if nodes are pinged repeatedly and statistical methods are used as described with reference to FIG. 6.

$$\begin{aligned}
\text{PropMax}_A &= \text{PingMeas}_A - \text{DEMin} - \text{LinkToPhyDelMin}_{BM} + \\
&\quad 2((\text{hops}-1)(\text{JPD})) - \text{ArbRespDelMin} - \\
&\quad \text{PingRespTimeMin} - \text{PhyToLinkDelMin}_{BM} \\
&= 1417 \text{ nS} - 240 \text{ nS} - 40 \text{ nS} + 6*20 \text{ nS} - 33.3 \text{ nS} - \\
&\quad 122 \text{ nS} - 81 \text{ nS} \\
&= 1021 \text{ nS} \\
\text{PropMax}_B &= \text{PingMeas}_B - \text{DEMin} - \text{LinkToPhyDelMin}_{BM} + \\
&\quad 2((\text{hops}-1)(\text{JPD})) - \text{ArbRespDelMin} - \\
&\quad \text{PingRespTimeMin} - \text{PhyToLinkDelMin}_{BM} \\
&= 2381 \text{ nS} - 240 \text{ nS} - 40 \text{ nS} + 6*20 \text{ nS} - 33.3 \text{ nS} - \\
&\quad 122 \text{ nS} - 81 \text{ nS} \\
&= 1985 \text{ nS} \\
\text{PropMin}_C &= \text{PingMeas}_C - \text{DEMax} - \text{LinkToPhyDelMax}_{BM} - \\
&\quad 2((\text{hops}-1)(\text{JPD})) - \text{ArbRespDelMax} - \\
&\quad \text{PingRespTimeMax} - \text{PhyToLinkDelMax}_{BM} \\
&= 926 \text{ ns} - 260 \text{ nS} - 61 \text{ ns} - 2*20 \text{ nS} - 144 \text{ nS} - \\
&\quad 142 \text{ nS} - 102 \text{ nS} \\
&= 177 \text{ nS}
\end{aligned}$$

The Maximum Round Trip Time Calculations are as follows:

$$\begin{aligned}
\text{RTDelMax}_{BMA} &= \text{PropMax}_A \\
&= 1021 \text{ nS} \\
\text{RTDelMax}_{BMB} &= \text{PropMax}_B \\
&= 1985 \text{ nS} \\
\text{PDDeltaMin} &= \text{PDMin}_{BMA} + \text{PDMin}_{BMB} - \text{PDMax}_{AB} \\
&= 33.3 \text{ nS} + 33.3 \text{ nS} - 144 \text{ nS} \\
&= -77.4 \text{ nS} \\
\text{RTDelMax}_{AB} &= \text{PropMax}_A + \text{PropMax}_B - \\
&\quad 2(\text{PropMin}_C) - 2(\text{PDMin}_C) - 2(\text{PDDeltaMin}_C) \\
&= 1021 \text{ nS} + 1985 \text{ nS} - 2(177 \text{ nS}) - 2(33.3 \text{ nS}) - \\
&\quad 2(-77.4 \text{ nS}) \\
&= 2740 \text{ nS}
\end{aligned}$$

The largest round trip delay calculated for any leaf to leaf path is 2740 nS for node A to node B. Gap count is calculated using this value as follows:

$$\begin{aligned}
\text{GC} &= ((\text{BRMin})(\text{BRMax})(\text{RTDelMax}_{AB} + \text{ArbRespDelMax}_A + \\
&\quad \text{ArbRespDelMax}_B) - 51 \text{ BRMin} + 29 \text{ BRMax})/ \\
&\quad (32 \text{ BRMin} - 20 \text{ BRMax}) \\
&= ((98.294)(98.314)(2.74 \text{ uS} + 0.144 \text{ uS} + 0.144 \text{ uS}) - 51(98.294) + \\
&\quad 29*(98.314))/(32(98.294) - 20*(98.314)) \\
&= 22.98
\end{aligned}$$

The gap count in this example must be set to 23 to guarantee node A never sees an arbitration reset gap before node B sees a subaction gap.

Although various embodiments are specifically illustrated and described herein, it will be appreciated that modifications and variations of the present invention are covered by the above teachings and within the purview of the appended claims without departing from the spirit and intended scope of the invention. For example, although network 100 comprises only five nodes, it can be appreciated that a serial bus network can comprise any number of nodes in an infinite variety of patterns and still fall within the scope of the invention. For another example, although a PHY ping packet was used to measure propagation delays for network 100, it can be appreciated that any type of timing packet falls within the scope of the invention.

What is claimed is:

1. A method for determining a gap count for a serial bus network, comprising:

determining a round-trip delay time for transmitting a packet from a first leaf node to a second leaf node and back over a communication path between said nodes for each pair of leaf nodes in the network;

calculating a maximum round-trip delay time for each communication path;

determining a node latency delay time for each leaf node in the network;

selecting a longest maximum round-trip delay time and a longest node latency delay time for the network; and calculating a gap count using said selected times.

2. The method of claim 1, wherein said determining is performed by a measuring node.

3. The method of claim 1, wherein said determining a round-trip delay comprises:

pinging each pair of leaf nodes a plurality of times; and determining an average round-trip delay time and standard deviation for each pair of leaf nodes.

4. The method of claim 2, wherein said measuring node is one of said first and second leaf nodes, and wherein said determining a round-trip delay comprises:

sending a packet to said first leaf node from said second leaf node at a first time;

receiving a packet from said first leaf node at said second leaf node at a second time; and measuring said round-trip delay using said first and second times.

5. The method of claim 2, wherein said measuring node is a node other than said first and second leaf nodes, and wherein said determining a round-trip delay comprises:

sending a packet to said first leaf node from said measuring node at a first time;

receiving a packet from said first leaf node at said measuring node at a second time;

sending a packet to said second leaf node from said measuring node at a third time;

receiving a packet from said second leaf node at said measuring node at a fourth time; and measuring said round-trip delay using a formula:

round-trip delay=(second time−first time)+(fourth time−third time)+2×node latency delay of said measuring node.

6. The method of claim 2, wherein said determining a round-trip delay comprises:

sending a packet to said first leaf node from said measuring node at a first time;

receiving a packet from said first leaf node at said measuring node at a second time;

sending a packet to said second leaf node from said measuring node at a third time;

receiving a packet from said second leaf node at said measuring node at a fourth time;

locating an intermediate node in said communication path between said leaf nodes;

sending a packet to said intermediate node from said measuring node at a fifth time;

receiving a packet from said intermediate node at said measuring node at a sixth time; and measuring said round-trip delay using a formula:

round-trip delay=(second time−first time)+(fourth time−third time)−2×((sixth time−fifth time)+node latency delay for said intermediate node).

7. The method of claim 1, wherein said calculating uses a formula:

Gap Count=8.196×(maximum round-trip delay time+2×maximum node latency delay)−1.833.

8. The method of claim 6, further comprising rounding said gap count to a next largest integer.

9. An apparatus for determining a gap count for a serial bus network, comprising:

means for determining a round-trip delay time for transmitting a packet from a first leaf node to a second leaf node and back over a communication path between said nodes for each pair of leaf nodes in the network;

means for calculating a maximum round-trip delay time for each communication path;

means for determining a node latency delay time for each leaf node in the network;

means for selecting a longest maximum round-trip delay time and a longest node latency delay time for the network; and means for calculating a gap count using said selected times.

10. The apparatus of claim 9, wherein said means for determining a round-trip delay time is located in a measuring node.

11. The apparatus of claim 9, wherein said means for determining a round-trip delay comprises:

means for pinging each pair of leaf nodes a plurality of times; and means for determining an average round-trip delay time and standard deviation for each pair of leaf nodes.

12. The apparatus of claim 10, wherein said measuring node is one of said first and second leaf nodes, and wherein said means for determining a round-trip delay comprises:

means for sending a packet to said first leaf node from said second leaf node at a first time;

means for receiving a packet from said first leaf node at said second leaf node at a second time; and means for measuring said round-trip delay using said first and second times.

13. The apparatus of claim 10, wherein said measuring node is a node other than said first and second leaf nodes, and wherein said means for determining a round-trip delay comprises:

means for sending a packet to said first leaf node from said measuring node at a first time;

means for receiving a packet from said first leaf node at said measuring node at a second time;

means for sending a packet to said second leaf node from said measuring node at a third time;

means for receiving a packet from said second leaf node at said measuring node at a fourth time; and means for measuring said round-trip delay using a formula:

round-trip delay=(second time−first time)+(fourth time−third time)+2×node latency delay of said measuring node.

14. The apparatus of claim 10, wherein said means for determining a round-trip delay comprises:

means for sending a packet to said first leaf node from said measuring node at a first time;

means for receiving a packet from said first leaf node at said measuring node at a second time;

means for sending a packet to said second leaf node from said measuring node at a third time;

means for receiving a packet from said second leaf node at said measuring node at a fourth time;

means for locating an intermediate node in said communication path between said leaf nodes;

means for sending a packet to said intermediate node from said measuring node at a fifth time;

means for receiving a packet from said intermediate node at said measuring node at a sixth time; and means for measuring said round-trip delay using a formula:

round-trip delay=(second time−first time)+(fourth time−third time)−2×((sixth time−fifth time)+node latency delay for said intermediate node).

15. The apparatus of claim 9, wherein said means for calculating uses a formula:

Gap Count=8.196×(maximum round-trip delay time+2×maximum node latency delay)−1.833.

16. The apparatus of claim 15, further comprising a means for rounding said gap count to a next largest integer.

17. A computer-readable medium whose contents cause a computer system to determine a gap count for a serial bus network, by:

determining a round-trip delay time for transmitting a packet from a first leaf node to a second leaf node and back over a communication path between said nodes for each pair of leaf nodes in the network;

calculating a maximum round-trip delay time for each communication path;

determining a node latency delay time for each leaf node in the network;

selecting a longest maximum round-trip delay time and a longest node latency delay time for the network; and calculating a gap count using said selected times.

18. The computer-readable medium of claim 17, wherein said determining is performed by a measuring node.

19. The computer-readable medium of claim 17, wherein said determining a round-trip delay comprises:

pinging each pair of leaf nodes a plurality of times; and determining an average round-trip delay time and standard deviation for each pair of leaf nodes.

20. The computer-readable medium of claim 18, wherein said measuring node is one of said first and second leaf nodes, and wherein said determining a round-trip delay comprises:

sending a packet to said first leaf node from said second leaf node at a first time;

receiving a packet from said first leaf node at said second leaf node at a second time; and measuring said round-trip delay using said first and second times.

21. The computer-readable medium of claim 18, wherein said measuring node is a node other than said first and second leaf nodes, and wherein said determining a round-trip delay comprises:

sending a packet to said first leaf node from said measuring node at a first time;

receiving a packet from said first leaf node at said measuring node at a second time;

sending a packet to said second leaf node from said measuring node at a third time;

receiving a packet from said second leaf node at said measuring node at a fourth time; and measuring said round-trip delay using a formula:

round-trip delay=(second time−first time)+(fourth time−third time)+2×node latency delay of said measuring node.

22. The computer-readable medium of claim 18, wherein said determining a round-trip delay comprises:

sending a packet to said first leaf node from said measuring node at a first time;

receiving a packet from said first leaf node at said measuring node at a second time;

sending a packet to said second leaf node from said measuring node at a third time;

receiving a packet from said second leaf node at said measuring node at a fourth time;

locating an intermediate node in said communication path between said leaf nodes;

sending a packet to said intermediate node from said measuring node at a fifth time;

receiving a packet from said intermediate node at said measuring node at a sixth time; and measuring said round-trip delay using a formula:

round-trip delay=(second time−first time)+(fourth time−third time)−2×((sixth time−fifth time)+node latency delay for said intermediate node).

23. The computer-readable medium of claim 17, wherein said calculating uses a formula:

Gap Count=8.196×(maximum round-trip delay time+2×maximum node latency delay)−1.833.

24. The computer-readable medium of claim 23, further comprising rounding said gap count to a next largest integer.

25. A computer for determining a gap count for a serial bus network, comprising: a memory containing:

a round-trip delay time module;

a maximum round-trip delay time module;

a node latency delay time module;

a selection module;

a gap count module; and a processor for executing said modules.

26. A measuring node for determining a gap count for a serial bus network, comprising:

a pinging module having an output for determining a round-trip delay time;

a timer coupled to said pinging module, wherein said output is sent to a plurality of nodes and said timer measures the round-trip delay time between each pair of said plurality nodes; and a gap count determination circuit having an input coupled to said output for receiving said round-trip delay time between each pair of nodes and calculating said gap count for the network and wherein said gap count determination circuit determines a node latency delay time across said plurality of nodes.

27. An apparatus determining a gap count for a serial bus network, comprising:

at least one pair of leaf nodes;

a communication link connecting said leaf nodes; and a measuring node in communication with said leaf nodes, wherein said measuring node determines a round trip delay time between said leaf nodes over said communication path for use in determining the gap count and said measuring node determines a node latency delay time across said leaf nodes.

28. The measuring node of claim 26, wherein said timer for further determining an average round trip delay time and a standard deviation for said any pair of nodes in the network.

29. The apparatus of claim 27, wherein said measuring node is a node other than said at least one pair of leaf nodes.

30. The apparatus of claim 27, wherein said measuring node is located in said communication link connecting said leaf nodes.

31. The apparatus of claim 27, wherein said measuring node is located outside said communication link connecting said leaf nodes.

* * * * *

UNITED STATES PATENT AND TRADEMARK OFFICE
CERTIFICATE OF CORRECTION

PATENT NO. : 6,212,171 B1
DATED : April 3, 2001
INVENTOR(S) : LaFollette et al.

It is certified that error appears in the above-identified patent and that said Letters Patent is hereby corrected as shown below:

Column 2,
Line 57, delete "is" and insert -- are --;

Column 7,
Line 35, delete "delaY$_B$" and insert -- delay$_B$ --;

Column 16,
Line 36, after "network" insert -- , --.

Signed and Sealed this

Twenty-eighth Day of May, 2002

Attest:

*Attesting Officer*

JAMES E. ROGAN
*Director of the United States Patent and Trademark Office*